US008365276B1

(12) United States Patent
Sallam

(10) Patent No.: US 8,365,276 B1
(45) Date of Patent: Jan. 29, 2013

(54) SYSTEM, METHOD AND COMPUTER PROGRAM PRODUCT FOR SENDING UNWANTED ACTIVITY INFORMATION TO A CENTRAL SYSTEM

(75) Inventor: Ahmed Said Sallam, Sunnyvale, CA (US)

(73) Assignee: McAfee, Inc., Santa Clara, CA (US)

(*) Notice: Subject to any disclaimer, the term of this patent is extended or adjusted under 35 U.S.C. 154(b) by 857 days.

(21) Appl. No.: 11/953,693

(22) Filed: Dec. 10, 2007

(51) Int. Cl.
*G06F 11/00* (2006.01)
(52) U.S. Cl. .................................. 726/22; 713/189
(58) Field of Classification Search .............. 726/22; 713/189
See application file for complete search history.

(56) References Cited

U.S. PATENT DOCUMENTS

| | | | |
|---|---|---|---|
| 6,128,315 A | 10/2000 | Takeuchi | |
| 7,571,474 B2 * | 8/2009 | Ross et al. | 726/22 |
| 7,607,170 B2 * | 10/2009 | Chesla | 726/22 |
| 7,712,138 B2 * | 5/2010 | Zobel et al. | 726/25 |
| 7,779,156 B2 * | 8/2010 | Alperovitch et al. | 709/240 |
| 7,934,253 B2 * | 4/2011 | Overcash et al. | 726/22 |
| 2003/0023774 A1 | 1/2003 | Gladstone et al. | |
| 2004/0193943 A1 | 9/2004 | Angelino et al. | |
| 2005/0216957 A1 * | 9/2005 | Banzhof et al. | 726/25 |
| 2006/0265747 A1 * | 11/2006 | Judge | 726/22 |
| 2008/0104130 A1 | 5/2008 | Sallam | 707/200 |
| 2008/0109906 A1 | 5/2008 | Sallam | 726/24 |
| 2008/0127344 A1 | 5/2008 | Sallam | 726/23 |
| 2008/0288303 A1 | 11/2008 | Gray et al. | |
| 2009/0113548 A1 * | 4/2009 | Gray et al. | 726/24 |

OTHER PUBLICATIONS

U.S. Appl. No. 11/777,222, filed Jul. 12, 2007.
"Prevx—We detect the threats that others miss," copyright Prevx 2002-2007.
Automatic Detection of Sentence and Clause Units Using Local Syntactic Dependency, Kawahara, T.; Saikou, M.; Takanashi, K.; Acoustics, Speech and Signal Processing, 2007. ICASSP 2007. IEEE International Conference on vol. 4 Digital Object Identifier. 10.1109/ICASSP.2007.367179 Publication Year: 2007, pp. IV-125-IV-128 (Abstract Only).
Work in progress: preliminary analysis of developing team building skills in community college students, Akins, L.M.; Barbuto, D.C.; Frontiers in Education, 2004. FIE 2004. 34th Annual Digital Object Identifier: 10.1109/FIE.2004.1408786 Publication Year: 2004, pp. S3G/24-S3G/25 vol. 3 (Abstract Only).
Understanding and executing a declarative sentence involving a forms-of-be verb, Faris, W.; Cheng, K.; Systems, Man and Cybernetics, 2009. SMC 2009. IEEE International Conference on Digital Object Identifier: 10.1109/ICSME.2009.5346782 Publication Year: 2009, pp. 1633-1638 (Abstract Only).
Design and evaluation of a phonological phrase parser for Spanish text-to-speech, Karn, H.E.; Spoken Language, 1996. ICSLP 96. Proceedings., Fourth International Conference on vol. 3 Digital Object Identifier: 10.1109/ICSLP.1996.607953 Publication Year: 1996 , pp. 1696-1699 vol. 3 (Abstract Only).

* cited by examiner

*Primary Examiner* — Kambiz Zand
*Assistant Examiner* — Amare F Tabor
(74) *Attorney, Agent, or Firm* — Patent Capital Group

(57) ABSTRACT

A system, method and computer program product are provided for sending, to a central system, information associated with unwanted activity. In use, information associated with unwanted activity is identified utilizing a plurality of different types of security systems. Further, the information is sent to a central system.

14 Claims, 7 Drawing Sheets

SYSTEM, METHOD AND COMPUTER PROGRAM PRODUCT FOR SENDING UNWANTED ACTIVITY INFORMATION TO A CENTRAL SYSTEM

FIELD OF THE INVENTION

The present invention relates to identifying unwanted activity, and more particularly to security systems utilized for identifying unwanted activity.

BACKGROUND

Traditionally, security systems have been utilized for identifying unwanted activity (e.g. malware, etc.). In general, different security systems have employed various techniques for identifying unwanted activity. Just by way of example, virus scanners oftentimes employ scanning techniques, whereas firewalls usually employ filtering techniques. However, traditional security systems have customarily exhibited various limitations.

For example, traditional security systems have each been incapable of independently determining sufficient identifiable information associated with unwanted activity, such as a source of the unwanted activity, a technique utilized by the unwanted activity, etc. As another example, traditional security systems have conventionally been isolated from one another, thus preventing any sharing of information associated with identified unwanted activity. There is thus a need for addressing these and/or other issues associated with the prior art.

SUMMARY

A system, method and computer program product are provided for sending, to a central system, information associated with unwanted activity. In use, information associated with unwanted activity is identified utilizing a plurality of different types of security systems. Further, the information is sent to a central system.

DETAILED DESCRIPTION

Figure 1:
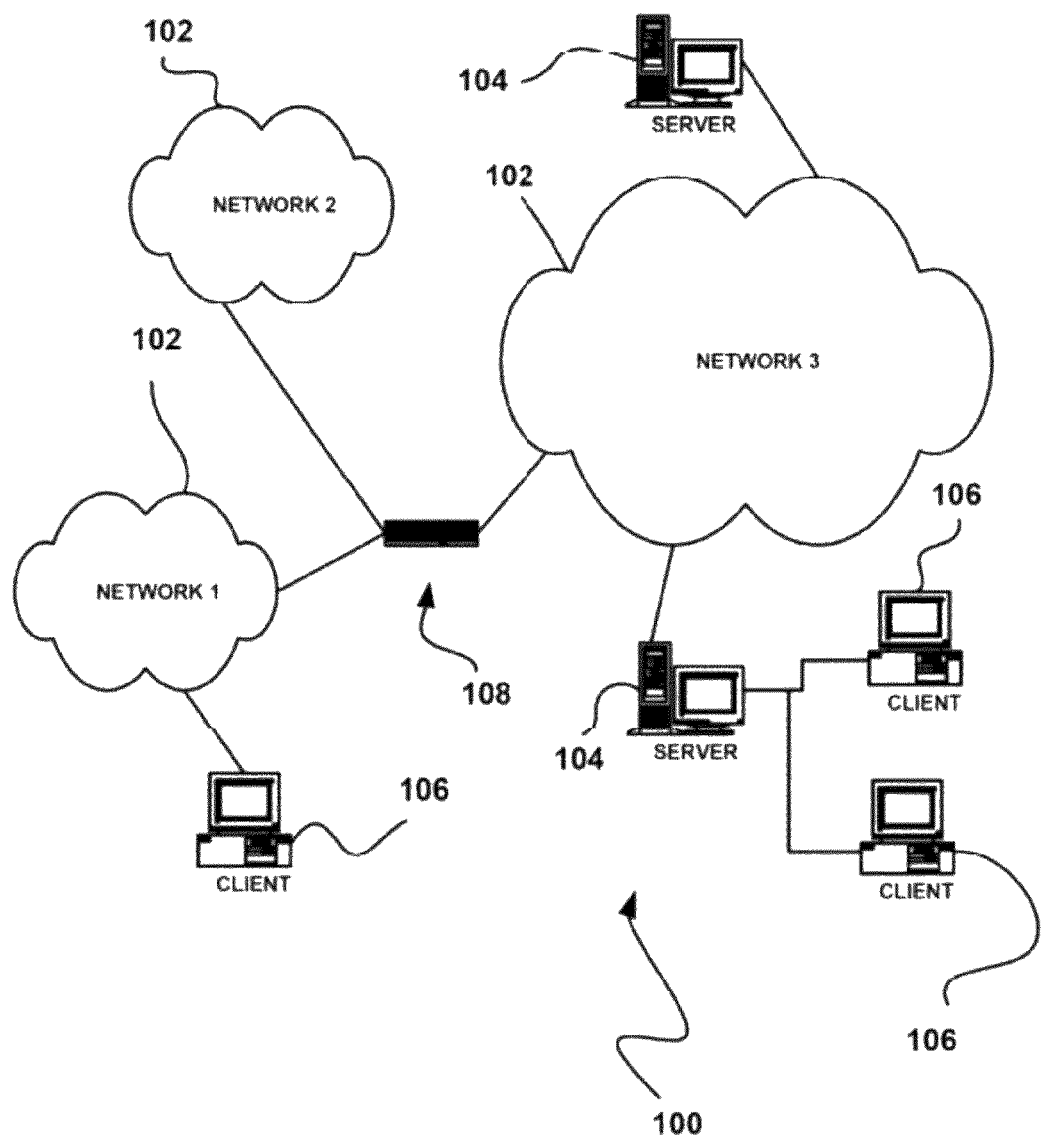
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, a peer-to-peer network, a personal area network (PAN), etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
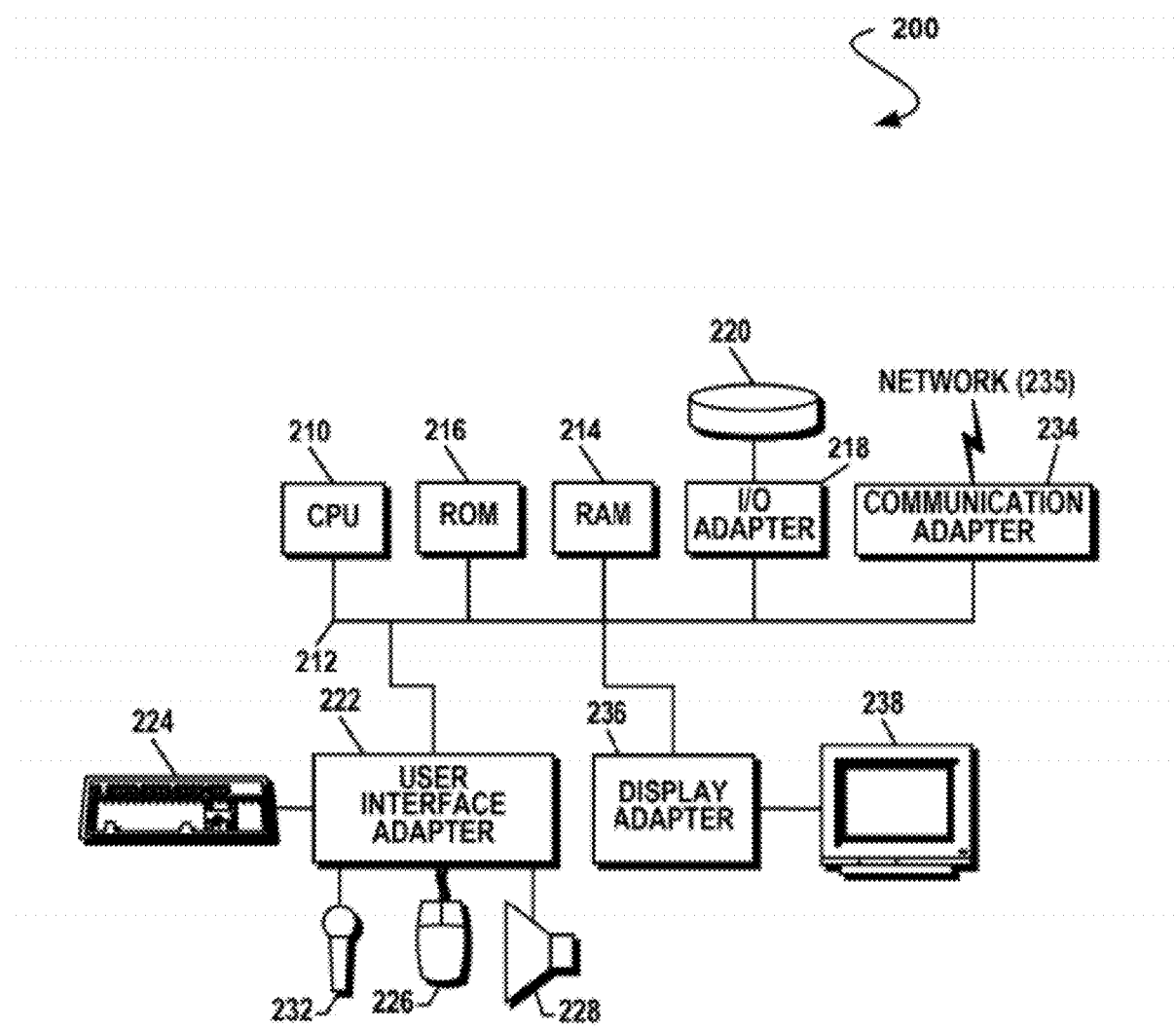
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
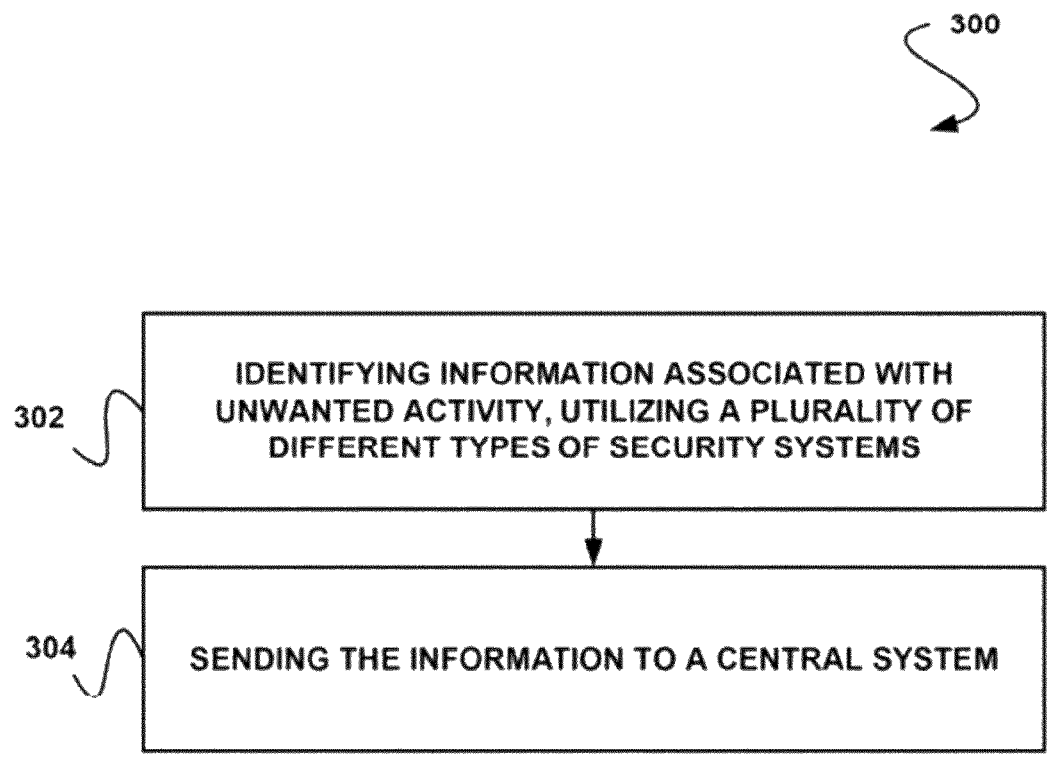
FIG. 3 shows a method for sending, to a central system, information associated with unwanted activity, in accordance with one embodiment.

FIG. 3 shows a method 300 for sending, to a central system, information associated with unwanted activity, in accordance with one embodiment. As an option, the method 300 may be carried out in the context of the architecture and environment of FIGS. 1 and/or 2. Of course, however, the method 300 may be carried out in any desired environment.

As shown in operation 302, information associated with unwanted activity is identified, utilizing a plurality of different types of security systems. In the context of the present description, the unwanted activity may include any activity that is determined to be unwanted or at least potentially unwanted. For example, the unwanted activity may include malware (e.g. a virus, a Trojan, a worm, etc.), spyware, unsolicited electronic messages, etc. and/or any combination thereof.

Optionally, the activity may be determined to be unwanted utilizing the security systems. Just by way of example, the security systems may compare the activity to known unwanted activity, monitor the activity, perform a behavioral analysis with respect to the activity, apply a rule to the activity, etc. In this way, the security systems may be utilized to detect the unwanted activity, and possibly confirms its unwanted status.

In the context of the present description, the information associated with the unwanted activity may include any information capable of identifying, characterizing, and/or describing, etc. the unwanted activity, and/or any other information that is relevant to the unwanted activity. For example, in one possible embodiment, the information may indicate a source of the unwanted activity. Thus, such information may include an internet protocol (IP) address of the source, a uniform resource locator (URL) of the source, etc. In other various examples, the information may include a time in which the unwanted activity was detected, code utilized by the unwanted activity, a manner in which the unwanted activity was received (e.g. by a device on which such unwanted activity was detected, etc.), a manner in which the unwanted activity executes (e.g. utilizing a trusted process, etc.), a type of the unwanted activity (e.g. virus, a worm, etc.), etc.

In another embodiment, the information associated with the unwanted activity may include a decision made in response to the unwanted activity, such as in response to detection of the unwanted activity. As an option, the decision may be to block execution of the unwanted activity, quarantine the unwanted activity, remove (e.g. uninstall, etc.) the unwanted activity, etc. Further, the decision may be made based on rules, a behavioral analysis, etc. To this end, the information may optionally indicate the decision made with respect to the unwanted activity.

In yet another embodiment, the information associated with the unwanted activity may include an alert. The alert may include a notification of the unwanted activity, for example. Optionally, the alert may identify the unwanted activity.

Accordingly, the information associated with unwanted activity may optionally be identified based on the detection of the unwanted activity. In one embodiment, the information may be identified by extracting the information from code utilized by the unwanted activity. In another embodiment, the information may be identified by monitoring and/or analyzing the unwanted activity. Of course, however, the information may be identified in any manner that utilizes the plurality of different types of security systems.

With respect to the present description, the security systems may include any systems capable of identifying information associated with unwanted activity. In various embodiments, the security systems may include a firewall, an intrusion prevention system, an anti-spyware system, a virus scanner, a system for identifying unsolicited electronic messages, a rootkit detection system, and/or an anti-phishing system, etc. Furthermore, the security systems may be different in the techniques utilized for identifying unwanted activity (e.g. virus scanning, filtering, etc.), the type of unwanted activity identified, and/or in any other manner.

As an option, the security systems may be located (e.g. installed, etc.) on a client system. For example, such client system may include any of the devices described above with respect to FIGS. 1 and/or 2. The security systems may also be located on a network, such as any of the networks described above with respect to FIG. 1. Moreover, the security systems may be integrated, and therefore in communication with one another.

It should be noted that, in one embodiment, the unwanted activity may include multiple instances of the same or different unwanted activity, where each instance is associated with a different security system. In this way, the identified information that is associated with the unwanted activity may be associated with different instances of unwanted activity.

With continuing reference to FIG. 3, the information is sent to a central system. Note operation 304. In the context of the present description, the central system may include any central system capable of receiving the information. For example, the central system may include any of the devices described above with respect to FIGS. 1 and/or 2.

Further, the information may be sent utilizing an electronic message, a report, etc. In one embodiment, the information may be sent to the central system by the client system on which the security systems are located. For example, the information may be sent by a client system which identified the information. As noted above, such client system may be located on a network.

In another embodiment, the central system may also be located on the network and/or in communication with the network. Thus, the information may optionally be sent to the central system over at least one network. Of course, however, the information may also be sent to the central system in any manner.

As an option, the information may be correlated prior to sending the information to the central system. Correlating the information may include aggregating portions of the information that are the same, for example. As another example, the information may be correlated by grouping portions of the information that are associated with the same instance of unwanted activity.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
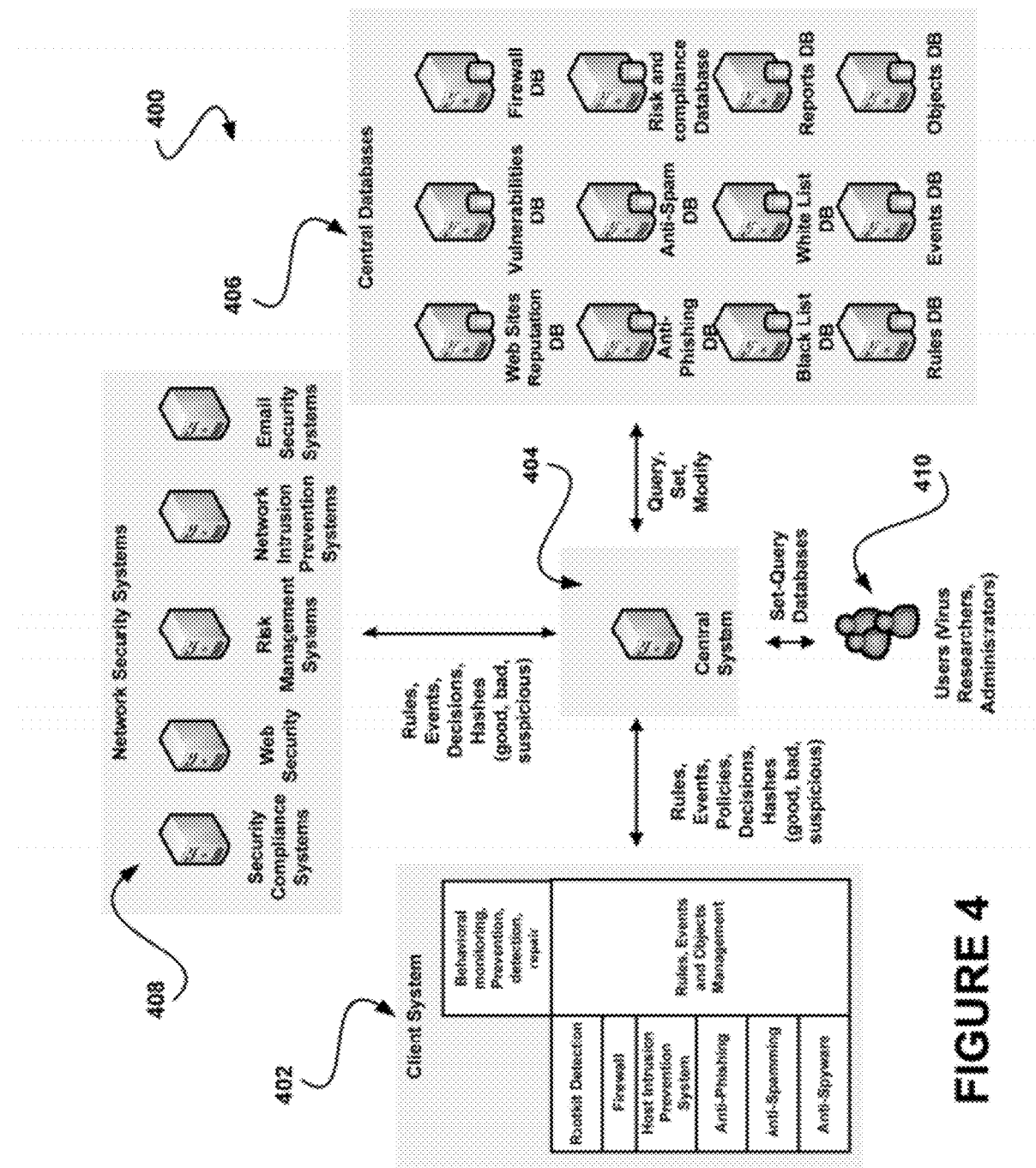
FIG. 4 shows a system for sending, to a central system, information associated with unwanted activity, in accordance with another embodiment.

FIG. 4 shows a system 400 for sending, to a central system, information associated with unwanted activity, in accordance with another embodiment. As an option, the system 400 may be implemented to carry out the method 300 of FIG. 3. Of course, however, the system 400 may be implemented in any desired environment. It should also be noted that the aforementioned definitions may apply during the present description.

As shown, a client system 402 is in communication with a central system 404. While not shown, it should be noted that multiple different client systems may also be in communication with the central system 404. As an option, the client system 402 may communicate with the central system 404 via a network (not shown). Of course, however, the client system 402 may communicate with the central system 404 in any desired manner.

The client system 402 includes a plurality of different security systems. As shown by way of example, the security systems may include a rootkit detection security system, a firewall, a host intrusion prevention system, an anti-phishing system, an unsolicited electronic message detection system (e.g. anti-spamming system), and an anti-spyware system. It should be noted that such security systems are set forth for illustrative purposes only, and that the client system 402 may include any security systems capable of identifying information associated with unwanted activity. As an option, the security systems may be integrated, such that each security system may be in communication with the other security systems on the client system 402.

The client system 402 also includes a database for storing data, such as rules, events, management instructions, objects, etc. In one embodiment, the rules stored in the database may be capable of being utilized by the security systems for detecting unwanted activity. For example, the rules may indicate to the security systems which identified activity is unwanted. Optionally, the rules may be correlated utilizing policies. In another embodiment, the rules may be received by the client system 402 from the central system 404.

Further, the events stored in the database may include data identifying events associated with the client system 402. For example, the events may include execution of a process (e.g. downloading of content, etc.), execution of an application (e.g. device drivers, dynamic link libraries, etc.), etc. Thus, the data may include a memory snapshot, a unique identifier (e.g. signature, etc.), version information, etc. associated with an event.

As an option, the events may be detected utilizing the security systems of the client system 402. As another option, the events may be performed on the client system 402. Still yet, the objects stored in the database may include objects stored on the client system 402. Just by way of example, the objects may include files, applications, network connections, etc.

In addition, the management instructions may include instructions for managing operations of the client system 402, such as the operations of the security systems. In one embodiment, the management instructions may indicate the objects to be monitored by the security systems. In another embodiment, the management instructions may indicate functions to be utilized by the security systems for detecting unwanted activity, functions for preventing unwanted activity, functions for responding to unwanted activity (e.g. repair functions, removal functions, cleaning functions, etc.), etc. As another option, the management instructions may be utilized for managing the rules, events, objects, and/or any other information associated with the client system 402.

In yet another embodiment, the management instructions may indicate information associated with unwanted activity detected at the client system 402 that is to be sent to the central system 404. For example, the management instructions may indicate the information associated with events, such as events associated with unwanted activity and/or wanted activity, that is to be sent to the central system 404. As another example, the management instructions may indicate whether information associated unwanted activity that has been detected and prevented is to be sent to the central system 404. As an option, the management instructions may be received from the central system 404.

The client system 402 also includes functions for performing behavioral monitoring, prevention, detection and repair of unwanted activity. Such behavioral monitoring may be utilized to monitor activity associated with the client system 402 utilizing heuristics, for example. In this way, the client system 402 may be capable of detecting unwanted activity, wanted activity (e.g. activity of wanted programs, etc.) without necessarily utilizing rules received from the central system 404. In addition, the client system 402 may be capable of making decisions, such as optionally preventing and/or repairing detected unwanted activity, without necessarily utilizing rules received from the central system 404.

In response to detecting unwanted activity, the client system 402 identifies information associated with the unwanted activity utilizing the security systems located on the client system 402. In one embodiment, the client system 402 may identify the information based on the rules stored on the client system 402. Of course, however, the client system 402 may identify the information in any desired manner. As shown, the information may indicate events associated with unwanted activity, decisions made by the client system 402 (e.g. with respect to prevention, repair, etc. of unwanted activity), hashes of code utilized by the unwanted activity, sources of unwanted activity, a time in which unwanted activity was detected, etc. Similarly, the client system 402 may also identify information associated with wanted activity.

As an option, the client system 402 may store the identified information in the database. Further, the client system 402 determines which identified information to send to the central system 404. As described above, management instructions stored in the database may be utilized for determining the identified information to be sent to the central system 404. Such identified information determined by the client system 402 is thus sent to the central system 404. Optionally, the client system 402 may correlate and/or format (e.g. normalize, etc.) the information prior to sending such information to the central system 404.

In response to receipt of the information associated with the unwanted activity, and optionally wanted activity, from the client system 402, the central system 404 performs an action based on the received information. For example, the central system 404 may include rules for determining which action to perform with respect to the received information. The rules may be defined manually by users 410 (e.g. virus researches, administrators, etc.), for example. The users 410 may optionally utilize any desired device for defining the rules.

In one embodiment, the action may include correlating the information with other information received by the central system 404, such as information received from a network security system 408, any other client system (not shown), etc. As an option, the information may be correlated with information stored in a central database 406. For example, the information may be sent to and stored in any number of a plurality of central databases 406 with which the central system 404 is in communication.

Optionally, the central system 404 may manage the central databases 406. For example, the central system 404 may query the central databases 406, modify (e.g. populate, etc.) the central databases 406, set (e.g. configure, etc.) the central databases 406, etc. Further, the central databases 406 may be populated with information received by the central server 404 from the client system 402, the network security systems 408, users 410, network crawlers (not shown), etc.

The central databases 406 may include a web site reputation database for storing information associated with reputations of particular web sites (e.g. information indicating web sites known to be associated with unwanted activity, etc.). In addition, the central databases 406 may include a vulnerabilities database for storing information associated with system and/or network vulnerabilities determined to be exploitable by unwanted activity. For example, the vulnerabilities may be associated with the client system 402, the network security systems 408, etc.

Further, the central databases 406 may include a firewall database for storing rules for filtering activity. The central databases 406 may also include an anti-phishing database and a database associated with unsolicited electronic messages (e.g. shown as an anti-spam database). Such anti-phishing database and anti-spam database may store rules for determining, respectively, whether activity includes phishing activity and/or unsolicited electronic messages. Any rules indicated by the firewall database, anti-phishing database and anti-spam database may be communicated to the associated security systems of the client system 402, via the central system 404, for example.

Still yet, the central databases 406 may include a risk and compliance database for indicating whether devices in communication with the central system 404 (e.g. the client system 402, network security systems 408, etc.) are in compliance with predetermined policies. The central databases 406 may further include a black list database for storing information (e.g. signatures, etc.) indicating known sources of unwanted activity, along with content, binaries, web sites, etc. known to be associated with unwanted activity. In addition, a white list database may store information (e.g. signatures, etc.) indicating sources of wanted (e.g. legitimate, etc.) activity, as well as content, binaries, web sites, etc. known to be associated with wanted activity.

Also, the central databases 406 may include a reports database for storing reports generated based on unwanted activity that has been detected. Of course, however, the reports may also be generated based on any information stored in any of the other central databases 406. Optionally, the reports database may also store real time and/or offline rules generated by a reporting engine.

Moreover, the central databases 406 may include a rules database for storing rules capable of being utilized by security systems of the client system 402, the network security systems 408 and/or the central system 404. Just by way of example, the rules may include operational rules for the central system 404 regarding correlating information, reporting information, etc. As another example, the rules may be utilized for automation associated with unwanted activity.

The central databases 406 may additionally include an events database for storing information identifying events associated with detected unwanted activity, and optionally wanted activity. For example, the events database may store information associated with unwanted activity detected by the client system 402, the network security systems 408, unwanted activity automation systems (not shown), etc. Of course, as another option, the events database may store information manually generated by users 410.

Furthermore, the central databases 406 may include an objects database for storing management instructions capable of being distributed to the devices in communication with the central system 404. For example, the management instructions may indicate which objects are to be monitored for unwanted activity. The objects database may also store information associated with objects (e.g. processes, files, registry entities, network connections, etc.) managed by the client system 402, objects [e.g. electronic mail servers, web servers, web sites, unsolicited electronic message servers, transmission control protocol/internet protocol (TCP/IP) connections, user datagram protocol/internet protocol (UDP/IP) connections, peer-to-peer (P2P) protocol connections, risk management states, etc.] managed by the network security systems 408, object relationships [e.g. a file downloaded from a web site, an application of the client system 402 and a distributed denial of service (DDoS) attack, a group of client systems that initiated a particular network attack, etc.], etc. Optionally, the events database and/or the objects database may be utilized for providing complete information on a history of unwanted activity associated with a network on which the central system 404 is located.

In another embodiment, the action performed by the central system 404 may include processing the information received from the client system 402. The processing may include analyzing the information. Just by way of example, the analysis may verify whether the unwanted activity associated with the information is in fact unwanted, and optionally whether wanted activity associated with the information is in fact wanted.

In yet another embodiment, the action may include sending a response to the client system 402 and/or any of the network security systems 408. Such response may be based on the information received by the central system 404. For example, the response may include a rule for detecting future instances of the unwanted activity, a rule for removing code utilized by the unwanted activity, etc. As another example, the response may include a rule for a rule (e.g. including a fingerprint of the wanted activity) for allowing instances of the wanted activity. Thus, the rule may be added to rules utilized by the client system 402 and/or any of the network security systems 408, such as a blacklist of rules associated with unwanted activity and/or a whitelist of rules associated with wanted activity. It should be noted that any rule sent to the client system 402 and/or any of the network security systems 408 may similarly be stored at the central system 404.

In still yet another embodiment, the action may include generating a report associated with the information. For example, the report may utilize data stored in the reports database to generate the report. Further, such report may be sent to the client system 402 and/or any of the network security systems 408.

In yet another embodiment, the action may include notifying a user 410 of the information associated with the unwanted activity. The notification may include an electronic message, for example. As an option, the notification may request the user 410 to perform a manual analysis with respect to the information associated with the unwanted activity. Of course, it should be noted that the above actions capable of being performed by the central system 404 in response to receipt of the information are set forth for illustrative purposes only, and that any desired action may be performed by the central system 404.

Moreover, as described above, the central system 404 is in communication with a plurality of network security systems 408. In the context of the present embodiment, the network security systems 408 may include any devices utilized for providing network security. In one optional embodiment, the network security systems 408 may be provided by a single security system provider. As another option, the network security systems 408 may be provided by multiple security system providers. As shown, the network security systems 408 may include a security compliance system, a web security system, a risk management system, a network intrusion prevention system, an electronic mail security system, etc.

To this end, the central system 404 may be in communication with the client system 402 and the network security systems 408 for sending updates (e.g. dynamically, etc.) to such client system 402 the network security systems 408. In one embodiment, the updates may include any information, such as rules, policies, white list information and/or black list information (e.g. hashes of web sites, applications network packets, scripts, etc.), etc. to the client system 402 and the network security systems 408. As an option, the updates may include information from the central databases 406. The updates may also include information received from other devices on the network. For example, information received from the client system 402 may be sent as an update to the network security systems 408, and vice versa.

Furthermore, the central system 404 may receive updates from the client system 402 and/or the network security systems 408. For example, the updates may indicate events detected via the client system 402 and/or the network security systems 408, decisions (e.g. repairs, prevention, etc.) made by the client system 402 and/or the network security systems 408, etc. To this end, the central system may be capable of receiving information, rules, decisions, alerts, etc. associated with multiple different security systems located on various devices on a network.

In one exemplary embodiment, the client system 402 may identify an application that is acting as spyware, utilizing a security system located on the client system 402. The client system 402 may thus report the application to the central system 404. For example, the client system 402 may send information indicating the application is spyware to the central system 404. In response to receipt of the information from the client system 402, the central system 404 may store the information in a central events database 406.

Further, the central system 404 may receive a report from a network security system 408 of a packet that has been sent over a network from the spyware application of the client system 402. Such report may indicate the particular sent packet. The central system 404 may then correlate the packet with the application in the central events database 406.

In another exemplary embodiment, the client system 402 may include a network browser which is utilized to access a web site. Upon a request to access the web site via the client system 402, the client system 402 may send information, such as a uniform resource locator (URL) to the central system 404 indicating the access request. The central system 404 may query a central black list database/central white list database 406 with the URL for determining whether the URL is included in such central black list database/central white list database 406.

The results of the query are then sent to the client system 402. Thus, if the URL is for a web site known to be associated with unwanted activity (e.g. if the URL matches an entry in the central black list database), the client system 402 may block the access to the web site. For example, such access may be blocked via a firewall of the client system 402.

Figure 5:
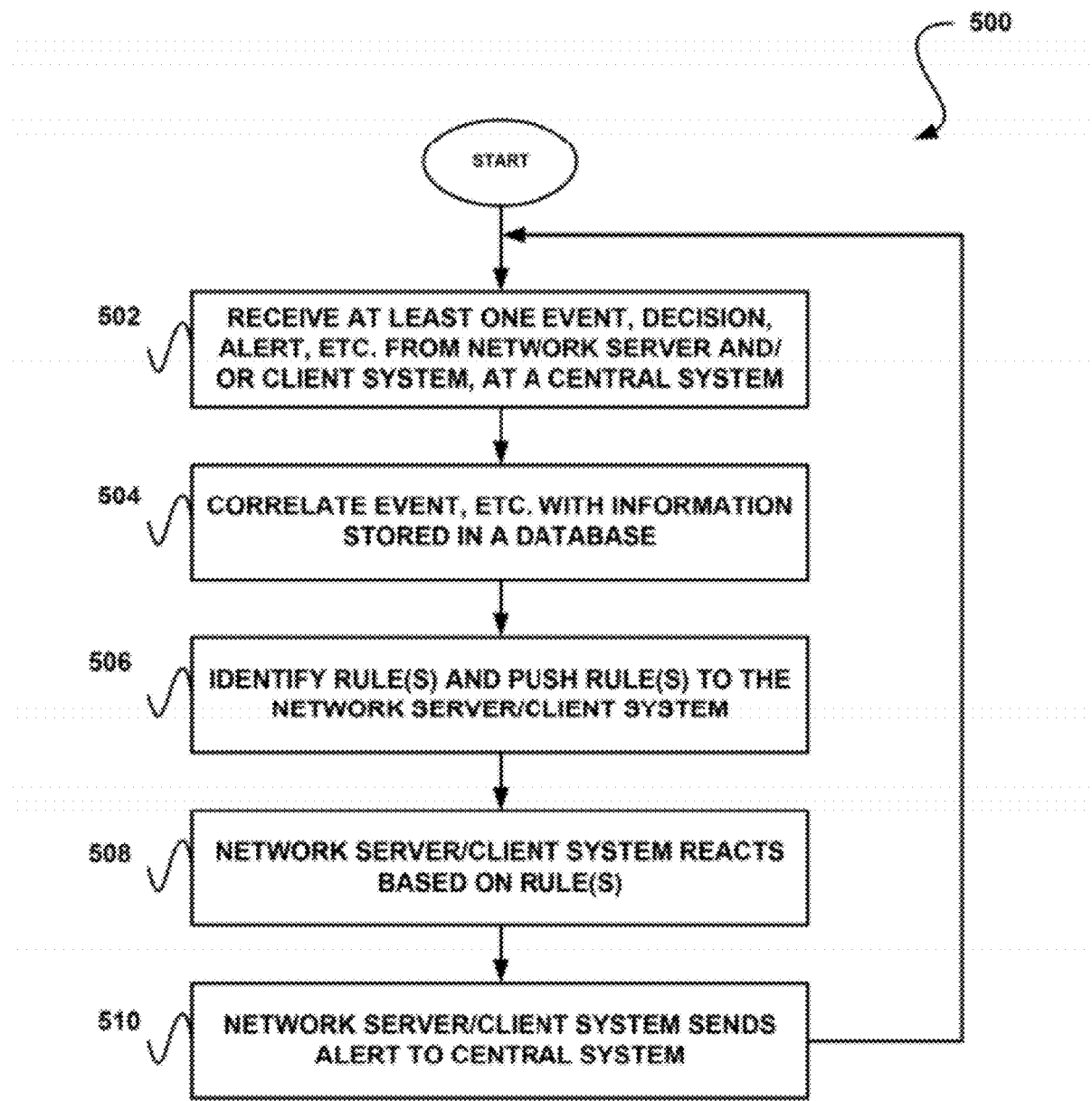
FIG. 5 shows a method for reacting to an event, decision and/or alert, in accordance with yet another embodiment.

FIG. 5 shows a method 500 for reacting to an event, decision and/or alert, in accordance with yet another embodiment. As an option, the method 500 may be carried out in the context of the functionality and architecture of FIGS. 1-4. Of course, however, the method 500 may be carried out in any desired environment. Again, it should also be noted that the aforementioned definitions may apply during the present description.

As shown in operation 502, at least one event, decision, alert, etc. is received from a network server and/or a client system, at a central system. For example, information on an event associated with unwanted activity detected on the client system may be sent to the central system by the client system. As another example, a decision made by the client system regarding how to react to the detected unwanted activity may also be sent to the central server by the client system. As yet another example, an alert may be sent to the central server by the network server (e.g. network security system, etc.) for notifying the central server of information associated with unwanted activity.

Additionally, the received event, decision, alert, etc. is correlated with information stored in a database, as shown in operation 504. In one embodiment, the central system may populate the database with the received event, decision, alert, etc. Such database may include a central database remotely located with respect to the central system, as an option. As another option, the database may include a database stored on the central system.

In another embodiment, the received event, decision, alert, etc. may be correlated by storing the received event, decision, alert, etc. in an associated database (e.g. a database storing similar information, etc.). For example, if an event was received, the event may be stored in an events database. In another embodiment, the received event, decision, alert, etc. may be correlated by storing the received event, decision, alert, etc. in a portion of the database that includes information associated with the received event, decision, alert, etc. Just by way of example, if an event is received, the event may be stored in a portion of the database that stores information associated with such event (e.g. such as a similar event that was previously detected, etc.).

Furthermore, at least one rule is identified and pushed to the network server and/or the client system, as shown in operation 506. In one embodiment, the rule may be identified utilizing a central database. For example, the central system may query a central rules database for a rule associated with the received event, decision, alert, etc. Optionally, the central system may utilized any portion of the received event, decision, alert, etc. (e.g. such as a source that initiated an event, etc.) for querying the central database to identify the rule. In another embodiment, identifying the rule may include generating the rule utilizing the central system, based on the received event, decision, alert, etc.

In addition, the rule may be pushed to the network server and/or the client system in any desired manner. In one embodiment, the rule may be pushed to the device from which the event, decision, alert, etc. was received. Thus, if the client system sent the event, decision, alert, etc. to the central system, the rule may be pushed to the client system. Of course, however, the rule may also be pushed to the network server if the event, decision, alert, etc. was received from the client system.

In this way, the client system and/or network server may be updated with the rule. Optionally, the central system may determine whether the client system and/or network server have the rule stored thereon, prior to pushing the rule to such client system and/or network server. Accordingly, the rule may be prevented from being pushed to a device (i.e. client system and/or network server) on which the rule is already located.

Still yet, the network server and/or the client system react based on the rule. Note operation 508. For example, if the client system received the rule, the client system may react based on the rule. Likewise, if the network server received the rule, the network server may react based on the rule.

In the context of the present embodiment, the reaction may include performing any operation that is based on the rule. Just by way of example, the reaction may include executing the rule, determining whether the rule is violated by the event, decision, alert, etc. sent to the central system, storing the rule in a database, verifying the accuracy of the rule, etc.

Moreover, the network server and/or the client system send an alert to the central system, as shown in operation 510. Optionally, the alert may be sent in response to the reaction performed by the network server and/or the client system. Thus, in one embodiment, the alert may include results of the reaction performed by the network server and/or the client system. For example, the alert may indicate whether the rule is valid, whether an event violated the rule, etc.

Figure 6:
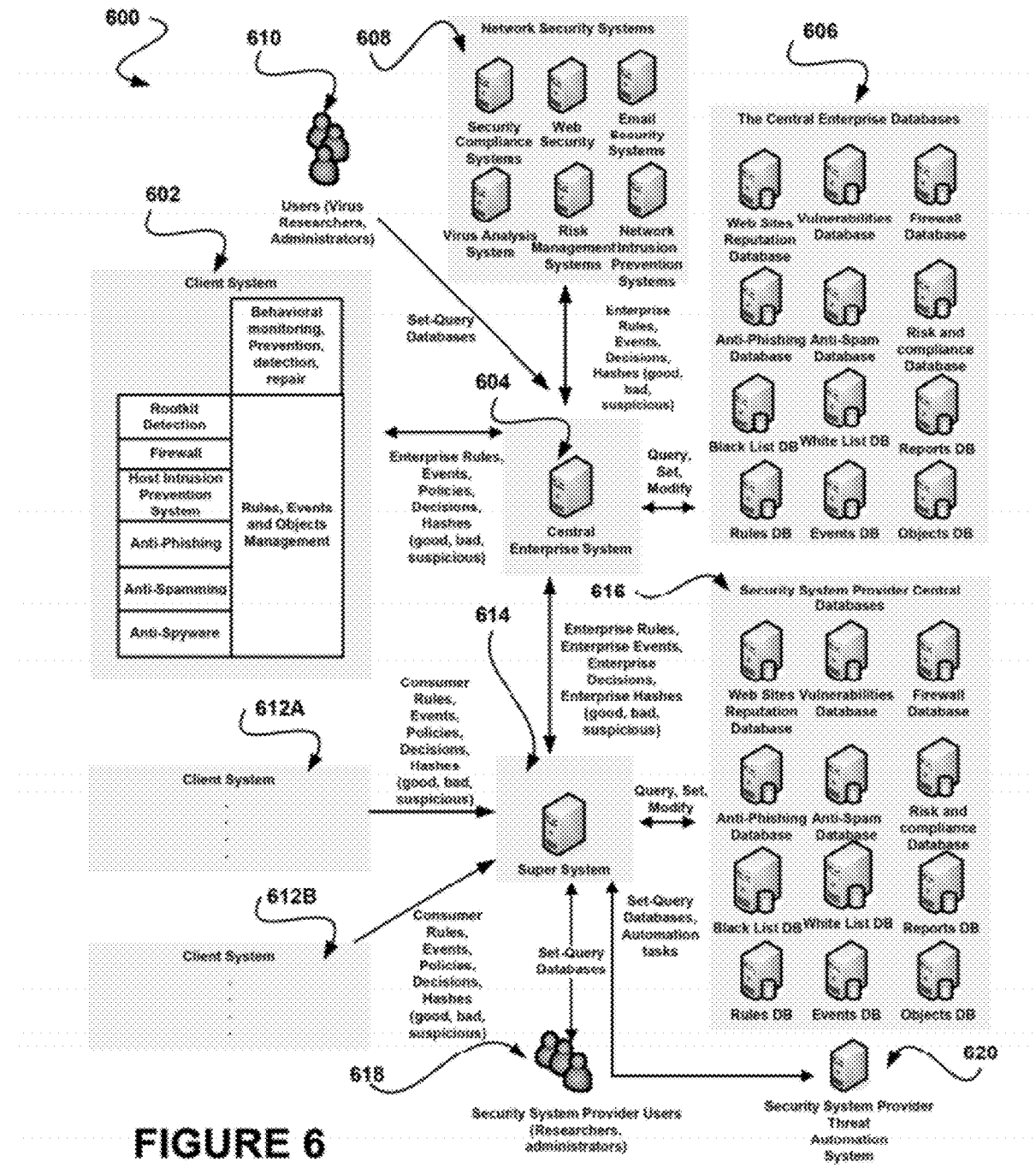
FIG. 6 shows a system for sending information associated with unwanted activity from a central system to a super system, in accordance with still yet another embodiment.

FIG. 6 shows a system 600 for sending information associated with unwanted activity from a central system to a super system, in accordance with still yet another embodiment. As an option, the system 600 may be implemented in the context of the functionality and architecture of FIGS. 1-5. Of course, however, the system 600 may be implemented in any desired environment. Again, it should also be noted that the aforementioned definitions may apply during the present description.

As shown, a first client system 602 is in communication with a central enterprise system 604. In the context of the present embodiment, the central enterprise system 604 may include a system managed by an enterprise, such as a central server of a LAN, for example. Accordingly, the first client system 602 may optionally be in communication with the central enterprise system 604 via an enterprise network.

The first client system 602 may identify events associated with unwanted activity utilizing a plurality of different security systems located on such first client system 602. The first client system 602 may also make decisions associated with such events, issue alerts associated with such events, etc. Further, the first client system 602 may send identified events, decisions, alerts, etc. to the central enterprise system 604.

Additionally, the central enterprise system 604 may react based on received events, decisions, alerts, etc. In one embodiment, the central enterprise system 604 may send updates (e.g. rules, policies, etc.) to the first client system 602. For example, the central enterprise system 604 may access data stored in central enterprise databases 606, for communicating such data to the first client system 602.

The central enterprise system 604 is also in communication with network security systems 608. The network security systems 608 may be provided by a security system provider, for example, for securing the enterprise network. Thus, the network security systems 608 may secure data communicated over the enterprise network, devices located on the enterprise network, etc.

Furthermore, the central enterprise system 604 is in communication with users 610, such as virus researchers, administrators, etc. Such users 610 may include users of the enterprise network, for example. The users 610 may receive information from the central enterprise system 604, such as information sent to the central enterprise system 604 by the client system 602 and/or the network security systems 608. In this way, the users 610 may manually analyze the information, in one embodiment. The users 610 may also communicate information to the central enterprise system 604, such as data with which to populate the central enterprise databases 606, requests for data from the central enterprise databases 606, etc.

Moreover, the central enterprise system 604 is in communication with a super system 614. The super system 614 may include a system utilized for sending and/or receiving information with respect to other second client systems 612A-B, other users 618, other central databases 616, etc. As an option, the super system 614 may be located on a network different from the enterprise network, such as for example, the Internet. In this way, the super system 614 may communicate with devices located on a network different from the enterprise network. Optionally, the super system 614 may be managed by the security system provider.

The second client systems 612A-B may identify events associated with unwanted activity utilizing a plurality of different security systems located on such second client systems 612A-B. The second client systems 612A-B may also make decisions associated with such events, issue alerts associated with such events, etc. Further, the second client systems 612A-B may send identified events, decisions, alerts, etc. to the super system 614.

Additionally, the super system 614 may react based on received events, decisions, alerts, etc. In one embodiment, the super system 614 may send updates (e.g. rules, policies, etc.) to the second client systems 612A-B. For example, the super system 614 may access data stored in security system provider central databases 616, for communicating such data to the second client systems 612A-B. Such security system provider central databases 616 may be managed by the security system provider that manages the super system 614, for example.

As shown, the super system 614 may also be in communication with a security system provider threat automation system 620. The security system provider threat automation system 620 may be utilized for securing the network on which the super system 614 is located. For example, the security system provider threat automation system 620 may communicate automation tasks to the super system 614 for instructing the super system 614 which operations to execute. As another example, the security system provider threat automation system 620 may configure, modify, query, etc. the security system provider central databases 616.

Furthermore, the super system 614 is in communication with users 618 associated with the security system provider, such as researchers, administrators, etc. The security system provider users 618 may receive information from the super system 614, such as information sent to the super system 614 by the second client systems 612A-B. In this way, the security system provider users 618 may manually analyze the information, in one embodiment. The security system provider users 618 may also communicate information to the super system 614, such as data with which to populate the security system provider central databases 616, requests for data from the security system provider central databases 616, etc.

Still yet, the central enterprise system 604 is in communication with the super system 614. In this way, the central enterprise system 604 and the super system 614 may optionally exchange rules, events, decisions, alerts, etc. received by client systems 602, 612A-B, network security systems 608, etc. For example, such exchange of information may allow central systems of different networks to communicate information associated with unwanted activity detected on such networks. As an option, the super system 614 may manage the central enterprise system 604 and the second client systems 612A-B, such as by sending management instructions to the central enterprise system 604 and the second client systems 612A-B, for example.

As another option, the super system 614 and the central enterprise system 604 may be hierarchically arranged. For example, the central enterprise system 604 may only disclose information to devices located on the enterprise network, such as the client system 602, the network security systems 608 and/or the central enterprise databases 606. Similarly, the super system 614 may optionally only disclose information to devices on its network, along with the central enterprise server 604. In this way, data (e.g. confidential data, etc.) communicated within the central enterprise system 604 may be protected from disclosure outside of the enterprise network.

Just by way of example, the central enterprise system 604 may include categorization rules for identifying levels associated with information. In one embodiment, the categorization rules may be user defined. The central enterprise system 604 may apply the categorization rules to received information for determining a level of the information. In various embodiments, the information may be associated with a single level or multiple levels. The information may thus conditionally be communicated to the super system 614 based on the level of the information, as an option.

Figure 7:
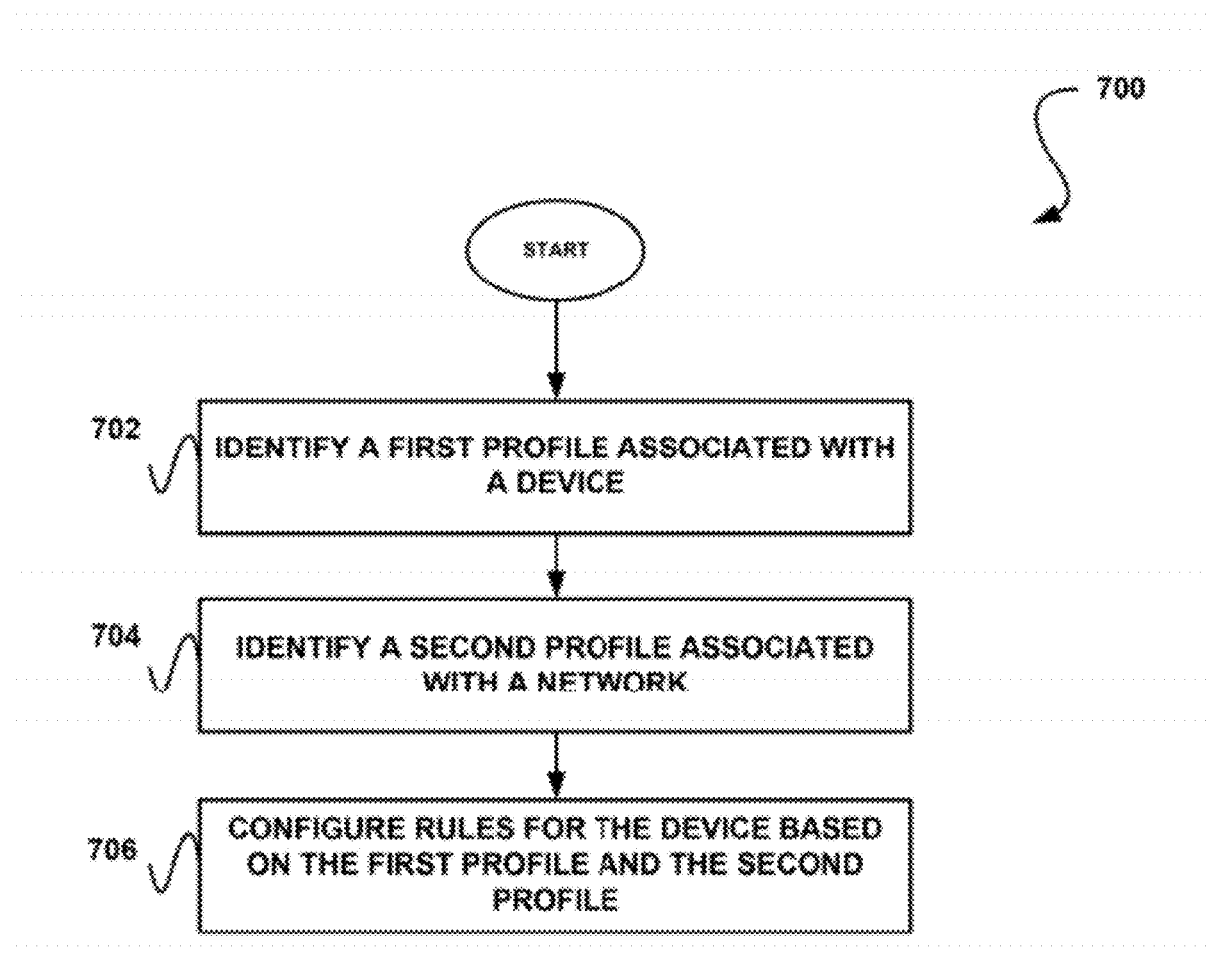
FIG. 7 shows a method for configuring a device, in accordance with still yet another embodiment.

FIG. 7 shows a method 700 for configuring a device, in accordance with still yet another embodiment. As an option, the present method 700 may be carried out in the context of the functionality and architecture of FIGS. 1-6. Of course, however, the method 700 may be carried out in any desired environment. Yet again, it should also be noted that the aforementioned definitions may apply during the present description.

As shown in operation 702, a first profile associated with a device is identified. In the context of the present embodiment, the device may include any device located on a network. For example, the device may include a client system. In one embodiment, the first profile may be identified in response to detection of the device. For example, the first profile may be identified upon a connection of the device to a network.

In addition, the first profile may include any characteristics associated with the device. In various embodiments, the first profile may include applications installed on the device, network connections of the device, hardware of the device, etc. As an option, the first profile may be identified utilizing a central system in communication with the device. For example, the central system may request information from the device that indicates the characteristics of the device. Of course, as another example, the central system may query a database for the first profile of the device.

Furthermore, a second profile associated with a network is identified, as shown in operation 704. In one embodiment, the network may include the network on which the device is located. In another embodiment, the network may include the network on which both the device and the central system are located. Optionally, the second profile may be identified utilizing the central system.

Moreover, such second profile associated with the network may include any information indicating characteristics of the network. For example, the second profile may indicate a type of the network (e.g. LAN, WAN, etc.). As another example, the second profile may indicate any other devices located on the network capable of being in communication with the device.

Still yet, rules are configured for the device based on the first profile and the second profile, as shown in operation 706. In the context of the present embodiment, the rules may include any policies, etc. capable of being utilized to by the device. In one embodiment, the rules may include rules for determining whether activity is unwanted. In another embodiment, the rules may indicate operations to perform in response to the detection of unwanted activity.

Additionally, configuring the rules may include dynamically generating the rules. In another embodiment, configuring the rules may include identifying rules applicable to information included in the first profile and/or the second profile, in one embodiment. Just by way of example, rules applicable to an operating system of the device may be identified for the device. As an option, a database of rules may be queried for identifying the rules. Such query may utilize the information included in the first profile and the second profile, in one embodiment. In another embodiment, the rules may be configured utilizing the central system.

Moreover, the rules may be sent to the device, as an option. Accordingly, the device may store the rules (e.g. in a database, etc.), such that the rules may be accessible to the device. For example, security systems of the device may access the rules for processing various activity identified on the device by such security systems. As an option, the rules of the device may be initially configured, for example, upon the device connecting to a network on which the central system is located. To this end, various devices in communication with a central system may be configured with different rules, based on a device profile and a network profile associated with each of such devices.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying information associated with unwanted activity, utilizing a plurality of different types of security systems of a client system, which includes a processor and a memory, and which is configured with a plurality of rules for resolving the unwanted activity independent of instructions provided by a central system, wherein at least one of the different types of security systems utilizes behavioral monitoring that includes heuristics;
    sending the information to the central system for aggregating the information with additional information sets provided by additional client systems; and
    receiving a response sent from the central system to the client and to the additional client systems, wherein the response is based on the information and is indicative of whether the information was verified as being associated with the unwanted activity, and wherein the response includes a rule for removing code associated with the unwanted activity, and the response includes a rule for detecting future instances of the information, and the response includes a rule for adding the information to a blacklist.

2. The method of claim 1, wherein the plurality of different types of security systems include two or more of a firewall, an intrusion prevention system, an anti-spyware system, and a virus scanner.

3. The method of claim 1, wherein the information is correlated prior to sending the information to the central system.

4. The method of claim 1, wherein the information includes a source of the unwanted activity.

5. The method of claim 1, wherein the information includes a decision made in response to the unwanted activity.

6. The method of claim 5, wherein the decision is to block execution of the unwanted activity.

7. The method of claim 1, wherein the information includes an alert.

8. The method of claim 1, further comprising detecting the unwanted activity, utilizing the plurality of different security systems.

9. The method of claim 8, wherein the unwanted activity is detected utilizing at least one rule received from the central system.

10. The method of claim 1, wherein the information is sent to a database via the central system.

11. The method of claim 1, wherein the information is sent to the central system for correlation with other information associated with at least one network security system.

12. A computer program product embodied on a non-transitory computer readable medium for performing operations, comprising:
    identifying information associated with unwanted activity, utilizing a plurality of different types of security systems of a client system, which includes a processor and a memory, and which is configured with a plurality of rules for resolving the unwanted activity independent of instructions provided by a central system, wherein at least one of the different types of security systems utilizes behavioral monitoring that includes heuristics;
    sending the information to the central system for aggregating the information with additional information sets provided by additional client systems; and receiving a response sent from the central system to the client and to the additional client systems, wherein the response is based on the information and is indicative of whether the information was verified as being associated with the unwanted activity, and wherein the response includes a rule for removing code associated with the unwanted activity, and the response includes a rule for detecting future instances of the information, and the response includes a rule for adding the information to a blacklist.

13. An apparatus, comprising:

a processor, wherein the apparatus is configured for:

identifying information associated with unwanted activity, utilizing a plurality of different types of security systems of a client system, which includes a processor and a memory, and which is configured with a plurality of rules for resolving the unwanted activity independent of instructions provided by a central system, wherein at least one of the different types of security systems utilizes behavioral monitoring that includes heuristics;

sending the information to the central system configured for aggregating the information with additional information sets provided by additional client systems; and receiving a response sent from the central system to the client and to the additional client systems, wherein the response is based on the information and is indicative of whether the information was verified as being associated with the unwanted activity, and wherein the response includes a rule for removing code associated with the unwanted activity, and the response includes a rule for detecting future instances of the information, and the response includes a rule for adding the information to a blacklist.

14. The apparatus of claim 13, wherein the processor remains in communication with memory and a display via a bus.

* * * * *